(12) United States Patent
Fineberg et al.

(10) Patent No.: US 8,706,687 B2
(45) Date of Patent: Apr. 22, 2014

(54) LOG DRIVEN STORAGE CONTROLLER WITH NETWORK PERSISTENT MEMORY

(75) Inventors: Sam Fineberg, Pleasanton, CA (US); Pankaj Mehra, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1415 days.

(21) Appl. No.: 11/626,678

(22) Filed: Jan. 24, 2007

(65) Prior Publication Data
US 2008/0177803 A1 Jul. 24, 2008

(51) Int. Cl.
*G06F 7/00* (2006.01)
*G06F 17/30* (2006.01)

(52) U.S. Cl.
USPC ............................... 707/609; 707/615

(58) Field of Classification Search
USPC ......... 707/2, 200, 1, 102, 204, 607, 648, 703, 707/609, 615, 827; 709/203, 212, 220, 230, 709/250; 711/162
See application file for complete search history.

(56) References Cited

U.S. PATENT DOCUMENTS

| | | | |
|---|---|---|---|
| 6,721,806 B2* | 4/2004 | Boyd et al. | 719/312 |
| 7,321,907 B2* | 1/2008 | Tsuchida et al. | 707/204 |
| 8,271,669 B2* | 9/2012 | Bestler | 709/230 |
| 2005/0203961 A1* | 9/2005 | Mehra et al. | 707/200 |
| 2005/0216552 A1* | 9/2005 | Fineberg et al. | 709/203 |
| 2006/0074847 A1* | 4/2006 | Yatabe et al. | 707/1 |
| 2006/0075057 A1* | 4/2006 | Gildea et al. | 709/212 |
| 2006/0218200 A1* | 9/2006 | Factor et al. | 707/200 |
| 2007/0118574 A1* | 5/2007 | Franklin et al. | 707/204 |
| 2007/0185920 A1* | 8/2007 | Castro et al. | 707/201 |
| 2007/0185924 A1* | 8/2007 | Kawamura | 707/202 |
| 2007/0271313 A1* | 11/2007 | Mizuno et al. | 707/202 |
| 2008/0092139 A1* | 4/2008 | Ruby | 718/101 |

* cited by examiner

*Primary Examiner* — Md. I Uddin (57) ABSTRACT

A method of updating database volumes by writing database updates to a smart storage controller, and having the smart storage controller generate the log update records for updating local and remote log volumes, and data volumes.

20 Claims, 6 Drawing Sheets

LOG DRIVEN STORAGE CONTROLLER WITH NETWORK PERSISTENT MEMORY

This invention relates to the increased throughput of a Database ("DB") Input/Output ("I/O") systems with respect to the access of data volumes which may be stored on Enterprise Storage Systems ("ESS") Redundant Array of Inexpensive Disk ("RAID") or other redundant storage protection schemes. This throughput increase is realized through the unique application of a Network-attached Persistent Memory Unit ("nPMU") consisting of non-volatile memory store ("nvRAM") combined with a Remote Direct Access Memory ("RDMA") capable network interface card ("NIC") and a change in the way the DB commits changes to disk.

The concept of a Network-attached persistent memory unit ("nPMU") was described in A Communication-link Attached Persistent Memory Unit, U.S. patent application Ser. No. 10/351,194 filed Jan. 24, 2003. Additional filings on persistent memory include: Communication-link Attached Persistent Memory System, U.S. patent application Ser. No. 10/808,138 filed Mar. 24, 2004, Transaction Processing Systems and Methods Utilizing Non-disk Persistent Memory, U.S. patent application Ser. No. 10/797,258 filed Mar. 9, 2004. All of the above are hereby incorporated by reference.

BACKGROUND OF THE INVENTION

Current database Input/Output ("I/O") systems (e.g., Oracle Database) consist of database writer processes, which make changes to one or more data volumes. Data volumes may be redundant (i.e., mirrored, RAID, etc.), although that kind of configuration detail is generally hidden behind some kind of a RAID controller or by operating system ("OS") software, so that they appear as simple block devices to the database. Database systems also include one or more log writer processes, which write the database log, a record of changes to the data volumes. Change records in the log contain "before" and "after" images of changed fields as well as a record of all processed transactions. In most commercial database systems, the log is updated before any changes are made to the data volumes, a technique called "write ahead logging." The log can be used to remove (undo) wrongly applied changes or re-apply (redo) any committed changes to the data volumes, in the event of transaction processing outages. The log may also be shipped to a remote backup system to enable remote replication of the database (for disaster tolerance), a technique known as "log shipping."

Database systems must preserve committed transactions; therefore, they typically require that all log entries relating to a transaction be completely written to the log disk before the transaction can be committed. Disk writes are typically slow, often taking milliseconds to complete. Further, log records will rarely fit within an even number of disk blocks, so writing individual log records would require expensive read-modify-write operations. These factors would severely limit the database system's transaction processing rate if each transaction's log entry were written separately to disk. Therefore, database systems tend to buffer the log and write it out to disk only periodically. While such buffering makes better use of disk drives, it delays transaction commitment thereby negatively impacting the throughput of certain response-time-critical workloads.

Likewise, while "boxcarring" of multiple "user" transactions into a single "system" transaction can reduce the number of transactions that a system must track and commit, it has penalties in user response time, lock contention, and memory usage. Worse still, boxcarring complicates application recovery when system transactions abort, because multiple unrelated user transactions must be retried.

DETAILED DESCRIPTION OF THE PREFERRED EMBODIMENTS

Figure 1:
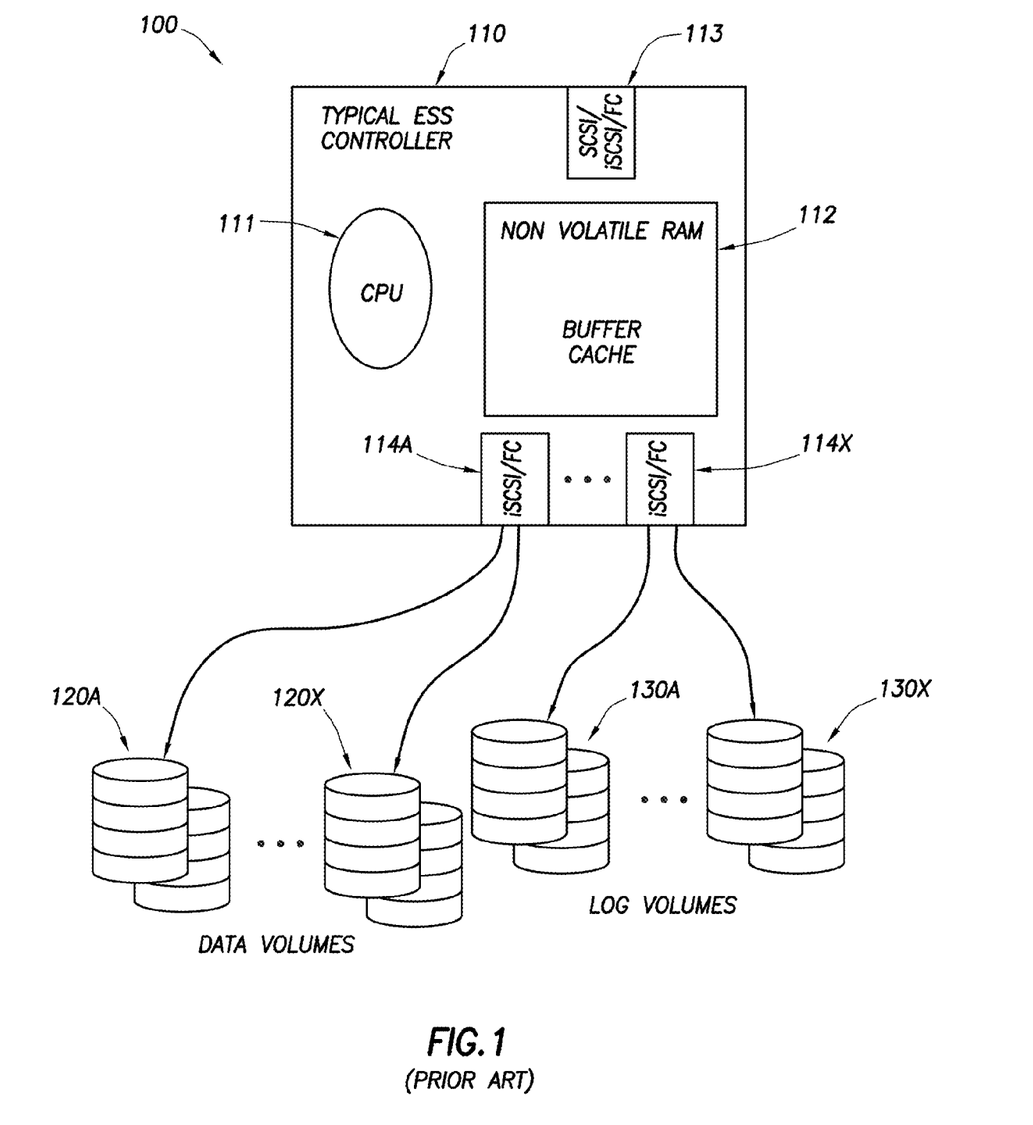
FIG. 1 is a diagram of a typical Enterprise Storage System.

One way of improving transaction latency is to use an enterprise-class storage system (ESS). FIG. 1 shows the hardware configuration 100 of a typical transaction processing system. It is comprised of a typical ESS controller 110 and disk drives containing the database records on the data volumes and the audit trail on the log volumes. It consists of a CPU 111, a non-volatile random access memory (NVRAM) 112, one or more interfaces to its disks 114A-114X (usually Fiber Channel or SCSI), and one or more interfaces to client systems 113 (usually Fiber Channel (FC), Small Computer Systems Interface (SCSI), internet SCSI (iSCSI), or even SCSI over TCP/IP). The non-volatile memory is used as a buffer cache for data being read or written. Because the buffer cache is NVRAM, writes may be considered complete once the data have been written to the buffer cache 112 even though they have not been written to disk, thus greatly reducing write latency. Further, if the write is to a mirrored file system or data volume 120A-1120X, 130A-130X, the cost of remote mirroring can be hidden by the ESS.

Figure 2:
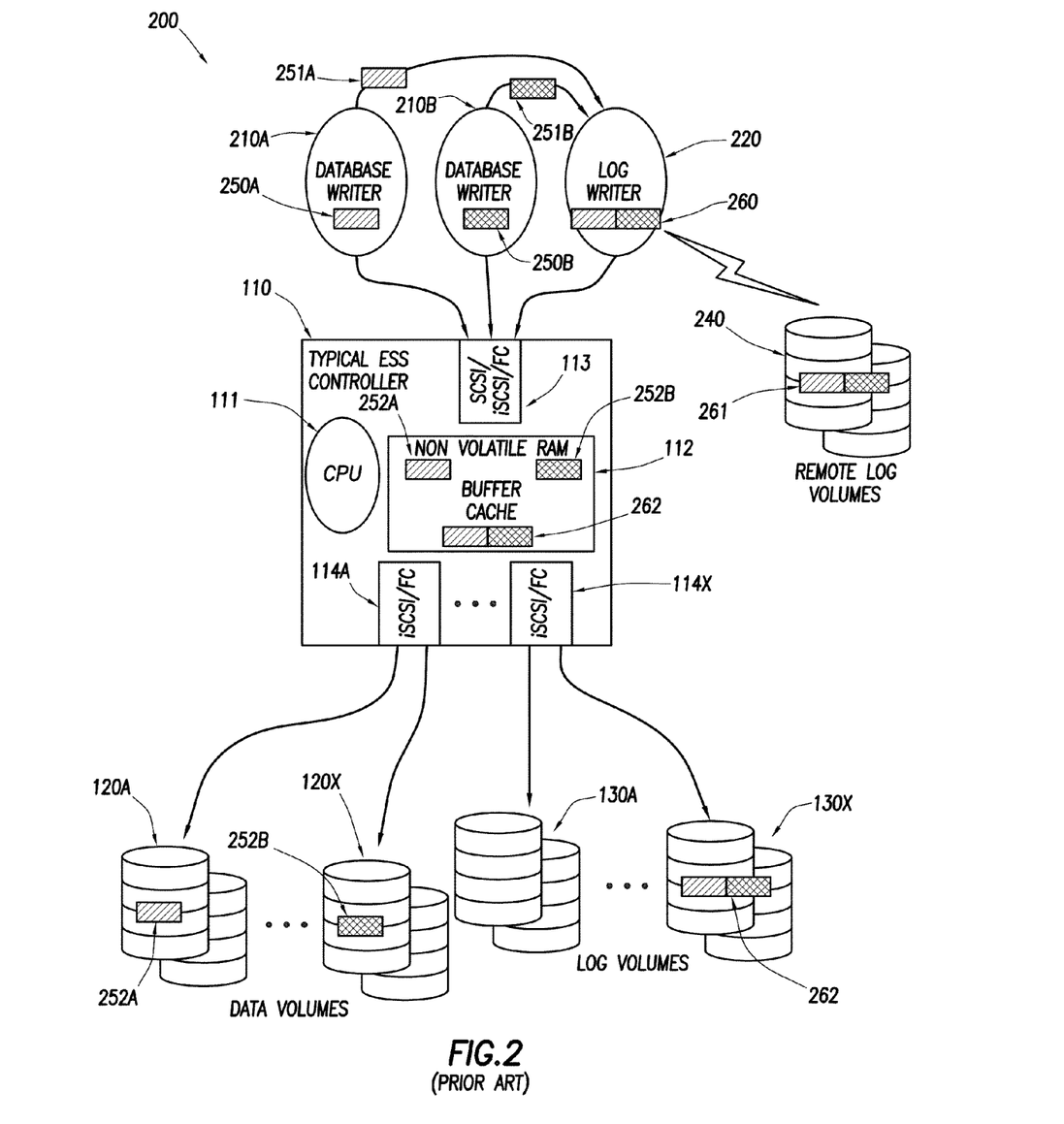
FIG. 2 is a diagram of updating a database stored on a Typical Enterprise Storage System.

FIG. 2 shows, by way of system 200, how the ESS hardware configuration of FIG. 1 is used by a database system (e.g., Oracle) to perform writes. The write/update path of the database system consists of one or more database processes 210A, 210B and one or more log managers/writers 220. The database processes are responsible for sending updates 250A, 250B to the log manager 260 as well as writing the changes to their database volumes (which reside on disks 120A-120X attached to the ESS controller 110). In order to preserve the semantics of write-ahead logging, the changes must be sent by the database writer to the log manager before they can be written to the database volume. The log manager must also write changes to the database log volume 130A-130X. To preserve the database's durability property, a transaction cannot commit until the write to the log volume has fully completed. Finally, in situations where disaster tolerance is needed, changes 261 must also be sent to a remote site 240, usually by the log manager 220. The writes to the database 252A, 252B and log volumes 262 flow through the ESS controller 110. The ESS controller uses its NVRAM 112 to buffer writes before they can be stored on disk. This reduces the visible store latency to the database or log writer processes.

The most significant observation from FIG. 2 is that every data has to be written by the database CPUs at least 4 times:

1. Changes are sent from the database writer to log manager 251A, 251B;
2. The log manager writes changes to 262;
3. The log manager writes records to a remote copy 261; and
4. The database writer writes updates to ESS 252A, 252B.

Modern ESSs use non-volatile caches for buffering write operations, but they still fail to achieve truly low latency because their latency is inherent in the SCSI-based storage protocols they use. All of Fibre Channel, Parallel SCSI, iSCSI, and SAS, use SCSI's command-driven model.

Figure 3:
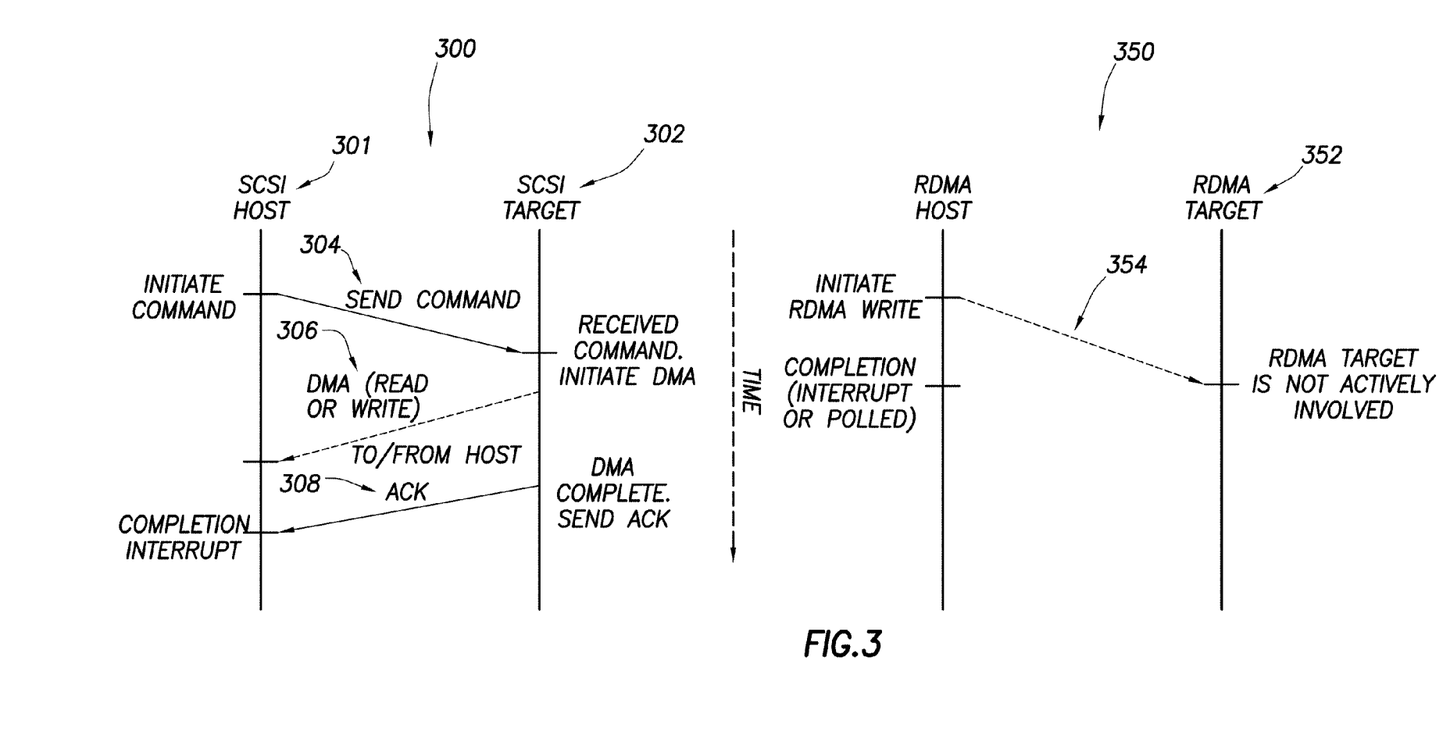
FIG. 3 is a comparison of SCSI command protocol and RDMA.

In the SCSI I/O model 300, the target device 302 causes data to be transferred 306 to/from the host CPU (initiator) 301, upon receiving a READ or WRITE command 304. Command transmission, command processing by target device, including data transfer, and notification of command completion 308, together consume minimum two round-trip times worth of wire latency. Because one or more processors (or at least complex state machines) on the SCSI target are in the actual data path, SCSI latencies, even with write caching enabled on the controller or device, are measured in 100s of microseconds. Historically, the data transfer step 306 dominated the total time from issuance to completion of a storage operation, which took several milliseconds. Short data transfers using modern I/O technologies complete in microseconds. The extra round trip required by SCSI protocol and its variants causes the latency of short transfers to be double that of protocols that require only one round-trip.

In addition, traditional storage protocols require that storage data be accessed in multiples of fixed-size blocks. Data accesses that are not block aligned require the full read/modify/write cycle, which either adds to the latency or restricts the granularity of block updates. Therefore, even when a database update involves only a small amount of change, say 16 bytes, the entire block (usually between 512 bytes and 64 K bytes) will have to be read into memory, modified (i.e., 16 bytes of it must be changed), then the entire block must then be written back to storage.

An alternate form of I/O is exemplified by the RDMA write operation available in memory-semantic networks, such as InfiniBand, VIA, and RDMA over IP. This is shown in the RDMA timeline 360 of FIG. 3. As can be seen, software and firmware on the RDMA target 352 are completely out of the data path. Latencies of fewer than 10 microseconds for memory-to-memory writes have been achieved using InfiniBand. Even lower latencies are possible as memory-semantic networking technologies improve. Reads can also be accomplished using this model if they are already resident within a known location in the target. Since RDMA networks support byte-grain access, updates do not require read/modify/write cycles, irrespective of alignment or size of access.

Persistent memory (PM) is memory that is durable, without refresh, so its contents survive the loss of system power. It additionally provides durable, self-consistent metadata in order to ensure continued access to the data stored on the PM even after power loss or soft failures. Persistent memory is more than just NVRAM: It combines the speed of memory-semantic access with the recoverability of storage-like metadata management.

Network persistent memory is persistent memory that is attached to a system through an RDMA network. This means that Network Persistent Memory is a resource that has all of the durability of disks with the I/O properties of RDMA as described above.

Implementation of persistent memory requires a device containing non-volatile memory and an RDMA network interface card (NIC). This device is called a Network Persistent Memory Unit ("nPMU"). One embodiment of a nPMU uses battery-backed dynamic RAM (BBDRAM) as the non-volatile memory technology. A Persistent Memory (PM)-enabled ESS must use an RDMA-enabled NIC and it should manage at least part of its NVRAM like a persistent memory unit instead of using all of it as a buffer cache.

The persistent memory area of the SSC can now be a managed block of persistent memory. Database or log writers can open regions of persistent memory in the SSC, and they can read and write them directly using RDMA. The buffer cache is still available, though smaller than before.

By replacing the ESS and it's SCSI I/O model with a Smart Storage Controller ("SSC") which has Persistent Memory ("PM") and a Remote Direct Memory Access ("RDMA") model. The functionality of the log manager can be relegated to the SSC, reducing the repetitive data transfers and achieving faster throughput.

Figure 4:
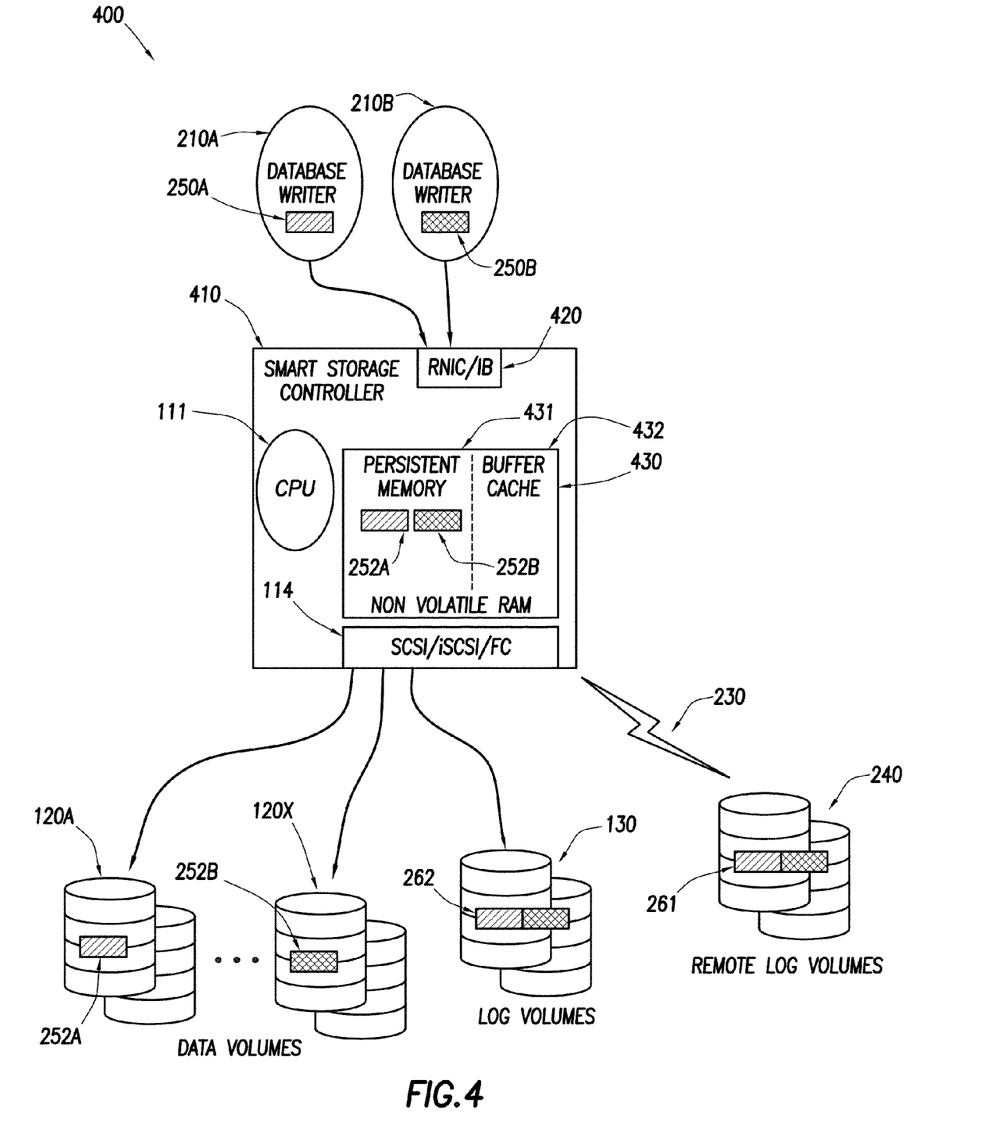
FIG. 4 is a diagram of updating a database stored on a log-driven storage controller with persistent memory in accordance with an exemplary embodiment of the invention.

The log record contains all of the necessary information to update the database including the updated data locations and the new values. So, significant improvements in I/O performance are possible by combining the storage architecture of an ESS and the access architecture of an nPMU, in the manner shown in FIG. 4 which shows a system 400 with the resulting Smart Storage Controller (SSC) 410. Its NVRAM 430 is now divided into a "persistent memory" region 431 and a "buffer cache" region 432. An RDMA enabled network ("RNIC") 420 now interconnects the processor to the storage system. The disk interface 114, there may be multiple, continue to be SCSI, iSCSI, or FC to interface with existing hardware, but can be upgraded if different volumes 120A-120X, 130, 240 are to be accessed.

Figure 5:
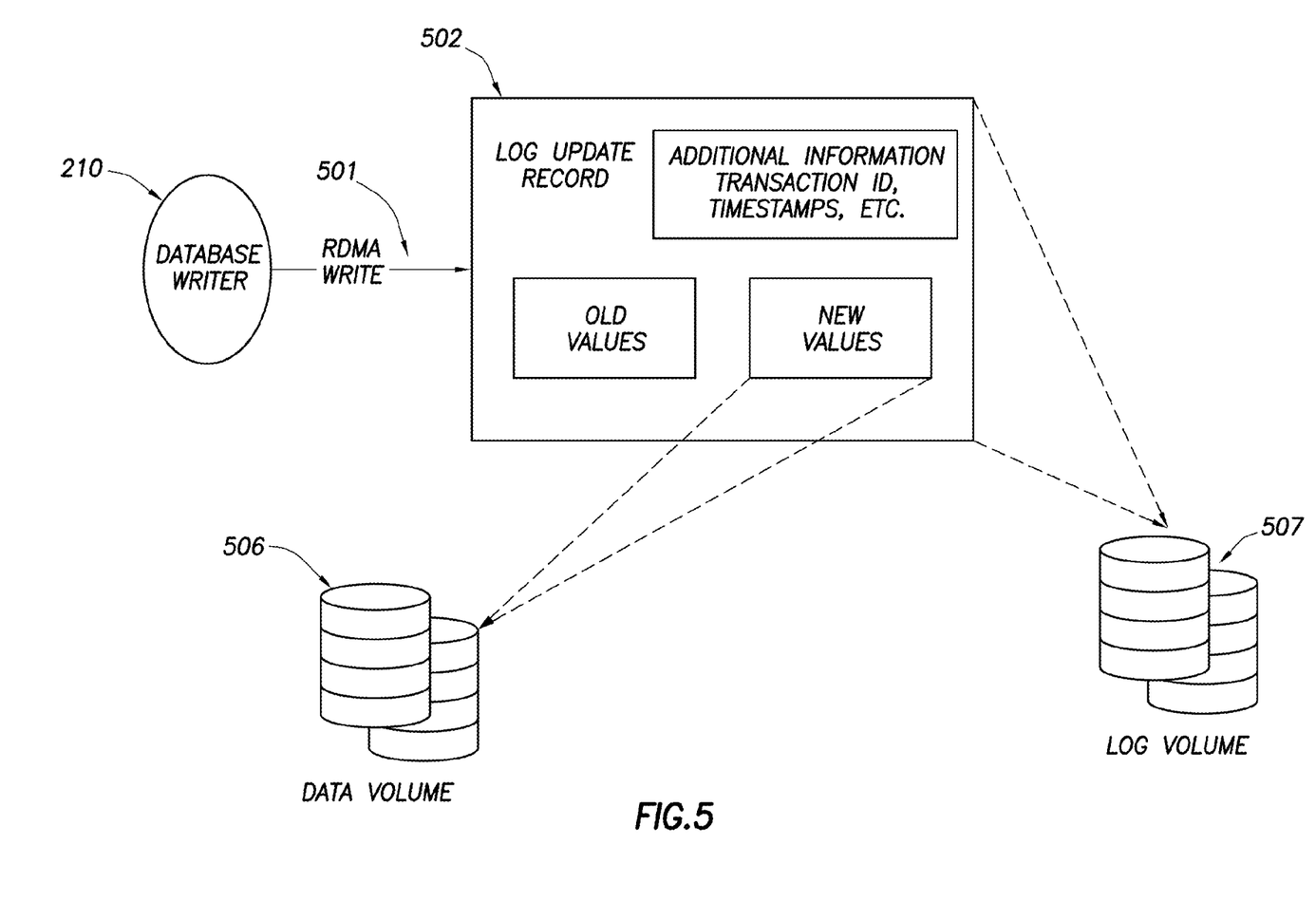
FIG. 5 is a diagram of a log record used to update both log and database volumes in accordance with an exemplary embodiment of the invention.

In FIG. 2 it was illustrated that much of the I/O performed in a database update is redundant. In fact, everything that is needed to update log volumes, data volumes, and the remote copies is contained in the log record. Since traditional database systems assume that there is no processing available near storage, they tend to place the update tasks close to the database CPUs. The SSC, besides having persistent memory like access, also packs the ability to operate on log records. Therefore, as shown in FIG. 5, to update the database we can simply have the database 210 write its part of the log record 502 to persistent memory in a SSC. All other I/O can be initiated by the SSC based on the data contained in that record. This means that we can commit a database update after only a single RDMA write 501, and the SSC can perform the actual disk writes to the log and data volumes 507, 506 as well as updating remote copies 240 (FIG. 4) in a lazy fashion, off the commit path. This is the essence of log-driven I/O. The log is written to persistent memory using RDMA 501, so it is fast, can be performed synchronously to reduce the protocol overhead, and since RDMA is byte-grained the log entry need not be block-aligned. For read access, we still operate through the standard data path, using the buffer cache area of the SSC's NVRAM to improve read performance.

Figure 6:
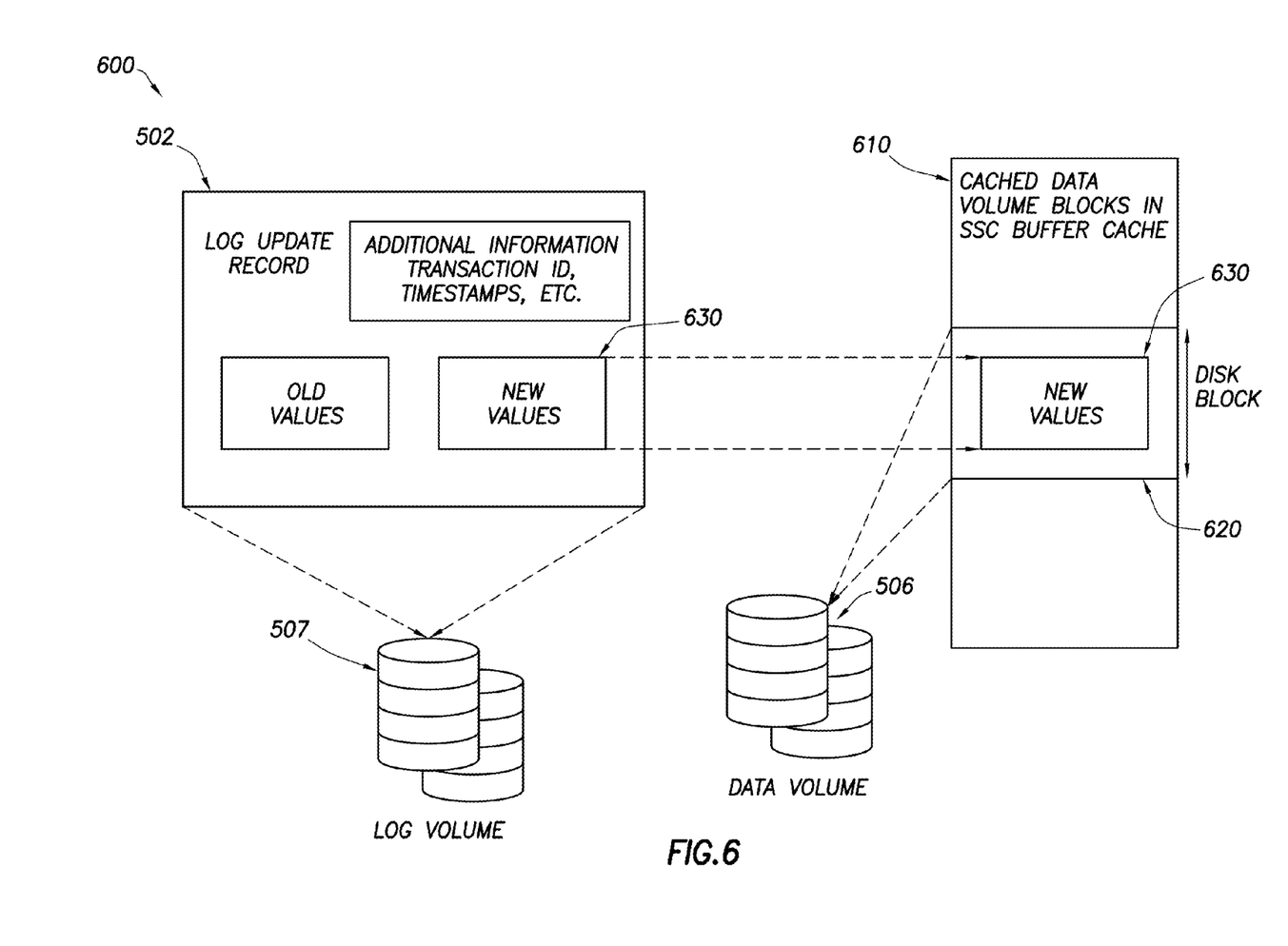
FIG. 6 is a diagram of partial block updates staged in the buffer cache portion of the storage controller's NVRAM in accordance with an exemplary embodiment of the invention.

Another advantage of maintaining the buffer cache in the SSC is that we can utilize it as a staging area for read-modify-write operations as shown in the system of FIG. 6. Most updates will not match up exactly with disk blocks. So, we can read a block to be updated 620 into the buffer cache 610 and update the portions of the block that have changed 630. This is similar to the read-modify-write that happens in the database or log writer with a traditional ESS, but it doesn't involve the database CPUs. With a log-driven SSC, the log writer's job has essentially been subsumed by the SSC.

As shown in FIG. 5, we have reduced the 4 accesses required for updating a database, described above, down to a single RDMA write operation. The SSC takes care of the data volume update, remote replication, and log volume writes, including any internal volume mirroring. Because these operations are out of persistent memory they can be performed off the database's commit path. The persistent memory unit is attached to an RDMA network, so it can be written with extremely low latency with byte-level granularity. This eliminates both the inherent overhead of the SCSI protocol and the read-modify-write cycle needed for unaligned writes to block storage. These changes will significantly enhance the throughput as well as the response time of any database or file system.

The flow diagrams in accordance with exemplary embodiments of the present invention are provided as examples and should not be construed to limit other embodiments within the scope of the invention. For instance, the blocks should not be construed as steps that must proceed in a particular order. Additional blocks/steps may be added, some blocks/steps removed, or the order of the blocks/steps altered and still be within the scope of the invention. Further, blocks within different figures can be added to or exchanged with other blocks in other figures. Further yet, specific numerical data values (such as specific quantities, numbers, categories, etc.) or other specific information should be interpreted as illustrative for discussing exemplary embodiments. Such specific information is not provided to limit the invention.

In the various embodiments in accordance with the present invention, embodiments are implemented as a method, system, and/or apparatus. As one example, exemplary embodiments are implemented as one or more computer software programs to implement the methods described herein. The software is implemented as one or more modules (also referred to as code subroutines, or "objects" in object-oriented programming). The location of the software will differ for the various alternative embodiments. The software programming code, for example, is accessed by a processor or processors of the computer or server from long-term storage media of some type, such as a CD-ROM drive or hard drive. The software programming code is embodied or stored on any of a variety of known media for use with a data processing system or in any memory device such as semiconductor, magnetic and optical devices, including a disk, hard drive, CD-ROM, ROM, etc. The code is distributed on such media, or is distributed to users from the memory or storage of one computer system over a network of some type to other computer systems for use by users of such other systems. Alternatively, the programming code is embodied in the memory (such as memory of the handheld portable electronic device) and accessed by the processor using the bus. The techniques and methods for embodying software programming code in memory, on physical media, and/or distributing software code via networks are well known and will not be further discussed herein.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A storage controller, comprising:
 a processor;
 a Random Access Memory (RAM) coupled to the processor, at least a portion of the RAM configured to be non-volatile, and a portion of the RAM utilized as a staging area for read-modify-write operations to a database;
 a first network interface coupled to the memory and configured to couple to a communication network, the first network interface configured to perform remote direct memory access (RDMA) to the RAM based on instructions received over the communication network; and
 a second network interface coupled to the processor and the RAM, the second network interface different than the first network interface, and the second network interface configured to read and write one or more memory disks;
 the storage controller is configured to:
  accept a first RDMA write of a log record for a first database transaction across the first network interface; and
  accept a second RDMA write of a log record for a second database transaction, different than the first database transaction, across the first network interface; and
 the processor is configured to:
  write a first set of log and data volumes regarding the first database transaction across the second network interface, contents of the write based only on the first RDMA write of the log record;
  determine contents of a write to the data volume for the second database transaction based only on the contents of the second RDMA write of the log record; and
  write a block of data to the data volume, the block of data containing both the content of the first database transaction and the second database transaction;
  wherein each write to a log or data volume for the first database transaction and the second database transaction is performed off the commit path of the database.

2. The storage controller of claim 1 wherein the processor is further configured to write a second set of log and data volumes, different that the first set, based only on the first RDMA write of the log record.

3. The storage controller of claim 1 wherein the write to the data volume is not block aligned.

4. The storage controller of claim 1, wherein the processor is configured to identify in the log record of the first RDMA write, new values to be written to the data volumes, and extract the new values from the log record of the first RDMA write.

5. The storage controller of claim 4, wherein the RAM is divided into a persistent memory region and buffer cache region.

6. The storage controller of claim 5, wherein the processor is configured to transfer the new values to the buffer cache region to update a block retrieved from one of the data volumes and stored in the buffer cache region.

7. The storage controller of claim 6, wherein the processor is configured to initiate the update and write the updated block to the data volume responsive only to the first RDMA write of the log record.

8. A method, comprising:
 performing, by a first network interface of a storage controller, remote direct memory access (RDMA) to a random access memory (RAM) based on instructions received by the first network interface over a communication network, wherein at least a portion of the RAM configured to be non-volatile, and a portion of the RAM is utilized as a staging area for read-modify-write operations to a database;
 reading, by a second network interface of the storage controller, from one or more memory disks wherein the second network interface different than the first network interface;
 writing, by the second network interface of the storage controller, to one or more memory disks;

receiving, by the storage controller, a first RDMA write of a log record for a first database transaction across the first network interface;

writing, by the storage controller, to a first set of log and data volumes regarding the first database transaction across the second network interface, wherein contents of the write are based only on the first RDMA write of the log;

receiving, by the storage controller, a second RDMA write of a log record for a second database transaction across the first network interface, wherein the second database transaction is different from the first database transaction;

determining, by the storage controller, contents of a write to the data volume for the second database transaction based only on the contents of the second RDMA write of the log record; and writing, by the storage controller, a block of data to the data volume, wherein the block of data contains both the content of the first database transaction and the contents of the second database transaction;

wherein each write to a log or data volume for the first database transaction and the second database transaction is performed off the commit path of a database.

9. The method of claim 8, further comprising:
writing, by the storage controller, a second set of log and data volumes, wherein the second set is different from the first set and is based only on the first RDMA write of the log record.

10. The method of claim 8, wherein the write to the data volume is not block aligned.

11. The method of claim 8, further comprising:
dividing the RAM into a persistent memory region and buffer cache region;
storing the received first RDMA write of a log record in the persistent memory region.

12. The method of claim 11, further comprising:
identifying in the log record of the first RDMA write, by the storage controller, new values to be written to the data volumes, and
extracting the new values from the log record of the first RDMA write.

13. The method of claim 12, further comprising transferring the new values to the buffer cache region to update a block retrieved from one of the data volumes and stored in the buffer cache region.

14. The method of claim 13, further comprising initiating the update and writing of the updated block to the data volume responsive only to the first RDMA write of the log record.

15. A non-transitory, storage medium containing computer software that when executed by a processor, causes a smart storage controller to:
perform a remote direct memory access (RDMA) to a random access memory (RAM) based on instructions received by a first network interface over a communication network wherein at least a portion of the RAM configured to be non-volatile, and a portion of the RAM is utilized as a staging area for read-modify-write operations to a database;

read from one or more memory disks using a second network interface;
write to one or more memory disks using the second network interface;
wherein the second network interface different than the first network interface;
receive a first RDMA write of a log record for a first database transaction across a first network interface;
write to a first set of log and data volumes regarding the first database transaction across a second network interface, wherein contents of the write are based only on the first RDMA write of the log;
receive a second RDMA write of a log record for a second database transaction, different than the first database transaction, across the first network interface;
determine contents of a write to the data volume for the second database transaction based only on the contents of the second RDMA write of the log record; and
write a block of data to the data volume, the block of data containing both the content of the first database transaction and the second database transaction;
wherein each write to a log or data volume for the first database transaction and the second database transaction is performed off the commit path of a database.

16. The non-transitory, storage medium containing computer software of claim 15, further causes a smart storage controller to:
write a second set of log and data volumes, different that the first set, based only on the first RDMA write of the log record.

17. The non-transitory, storage medium containing computer software of claim 15, wherein the write to the data volume is not block aligned.

18. The non-transitory, storage medium containing computer software of claim 15, that further causes the smart storage controller to:
divide the RAM into a persistent memory region and buffer cache region;
store the received first RDMA write of a log record in the persistent memory region;
Identify, in the log record of the first RDMA write, new values to be written to the data volumes, and
extract the new values from the log record of the first RDMA write.

19. The non-transitory, storage medium containing computer software of claim 18, that further causes the smart storage controller to transfer the new values to the buffer cache region to update a block retrieved from one of the data volumes and stored in the buffer cache region.

20. The non-transitory, storage medium containing computer software of claim 19, that further causes the smart storage controller to initiate the update and writing of the updated block to the data volume responsive only to the first RDMA write of the log record.

* * * * *

UNITED STATES PATENT AND TRADEMARK OFFICE
CERTIFICATE OF CORRECTION

| | |
|---|---|
| PATENT NO. | : 8,706,687 B2 |
| APPLICATION NO. | : 11/626678 |
| DATED | : April 22, 2014 |
| INVENTOR(S) | : Sam Fineberg et al. |

Page 1 of 1

It is certified that error appears in the above-identified patent and that said Letters Patent is hereby corrected as shown below:

In the Specification

In column 2, line 41, delete "1120X," and insert -- 120X, --, therefor.

In the Claims

In column 8, line 44, in Claim 18, delete "Identify," and insert -- identify, --, therefor.

Signed and Sealed this
Twelfth Day of August, 2014

Michelle K. Lee
*Deputy Director of the United States Patent and Trademark Office*